Sept. 8, 1970  C. M. McKEE ET AL  3,527,528

AUTOMATICALLY CONTROLLED MIRROR

Filed July 17, 1968  2 Sheets-Sheet 1

INVENTORS
CLYDE M. McKEE
ANDREW V. PROVENZINO
WARD SCOTT

BY Hauke, Kram, Gifford, + Patalidis
ATTORNEYS

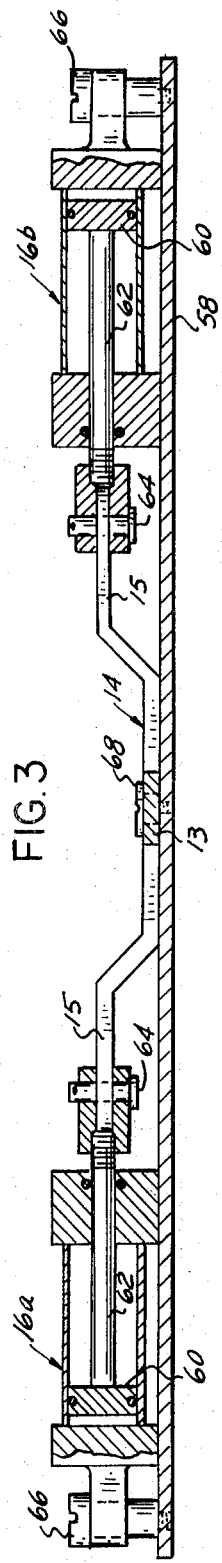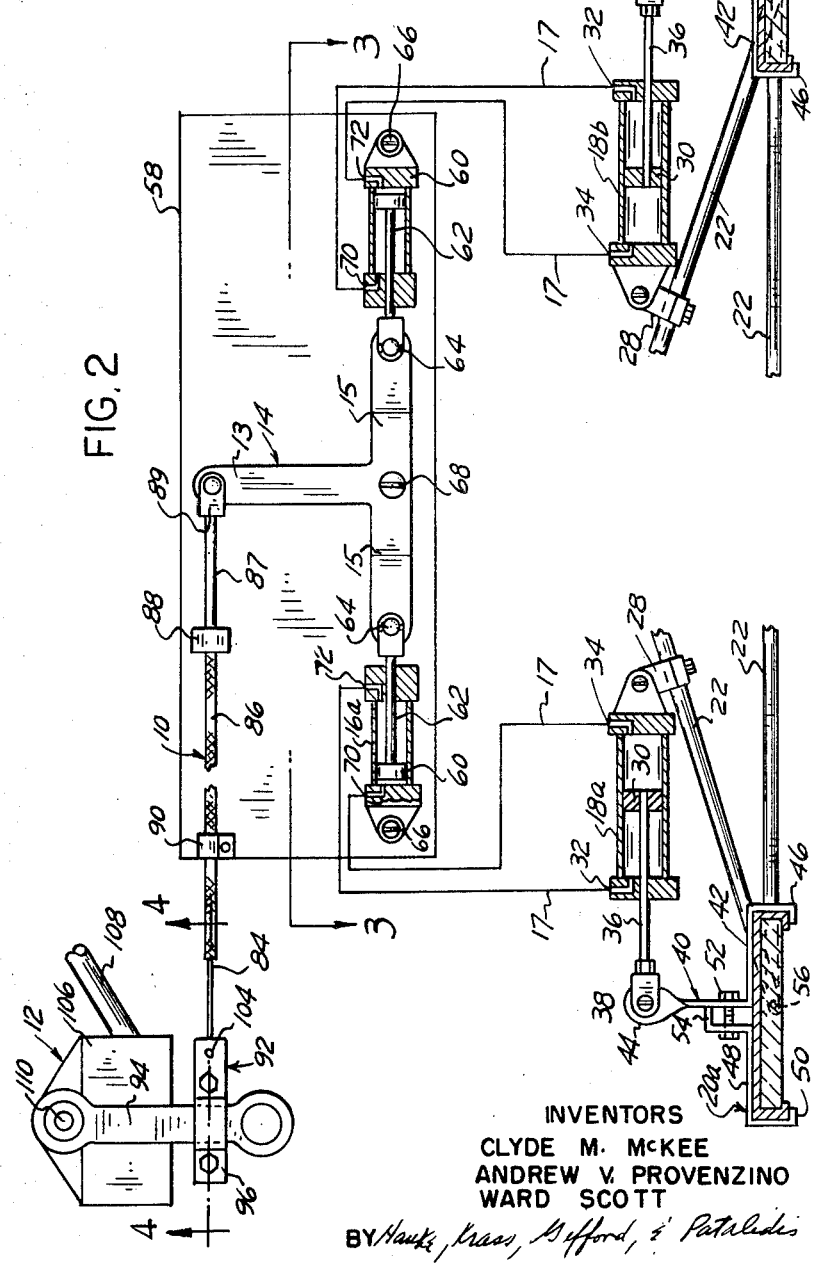

3,527,528
Patented Sept. 8, 1970

3,527,528
AUTOMATICALLY CONTROLLED MIRROR
Clyde M. McKee, 22175 Bernard, Taylor, Mich. 48180;
Andrew V. Provenzino, 16356 Cameron, Southgate,
Mich. 48192; and Ward Scott, 429 Rochdale Drive,
Rochester, Mich. 48063
Continuation-in-part of application Ser. No. 706,953,
Feb. 20, 1968. This application July 17, 1968,
Ser. No. 745,434
Int. Cl. G02b 5/08
U.S. Cl. 350—307                               11 Claims

ABSTRACT OF THE DISCLOSURE

A mirror assembly for trucks or a like actuated in response to movement of the steering wheel to move to a position providing maximum visibility. Means are clamped to a member which is a part of the steering mechanism and which is pivotally movable upon rotation of the steering wheel in such a way that pivoting of the member is translated through the means to a T-shaped pivotal member. The T-shaped pivotal member is connected to a hydraulic system to produce rotation of the mirrors upon pivotal movement of the T-shaped member.

CROSS REFERENCE TO RELATED APPLICATIONS

The present application is a continuation-in-part of application Ser. No. 706,953, filed Feb. 20, 1968.

BACKGROUND OF THE INVENTION

Field of the invention

The present invention relates to exteriorly mounted rearview mirrors for trucks and the like and more particularly to means for automatically varying a position of the mirrors in response to movement of the steering wheel.

Description of the prior art

Means have been heretofore provided to produce movement of exteriorly mounted vehicle mirrors as the vehicle is turning so that the rear of the vehicle remains in the vision of the driver throughout the turn. The problem of seeeing the rear of the vehicle is particularly difficult where truck and trailer combinations are used and especially when a right hand turn is being made. In such situations the setting of the mirror necessary for straight ahead driving causes the right hand mirror to the directed against the side of the trailer when a right hand turn is being made. The left hand mirror in such situations is also of little use since it is directed toward an area away from the left side of the trailer throughout much of the turn. Similarly, when making a left hand turn, the left hand mirror will be directed against the left side of the trailer and the right hand mirror will be well away from the right side of the trailer. This is not a critical as the right turn situation because the driver is positioned on the left side of the vehicle and is therefore in a better position to see that side of the vehicle.

Previous attempts to provide a solution to this problem have not met with success for several reasons. Prior to our aforementioned copending application there has been no apparatus for ready attachment to existing trucks and mirror assemblies to convert them to automatically actuated devices. Such apparatus as has been previously suggested has required that the units be built into the structure of the truck itself or that extensive and expensive modifications be made on the vehicle to install new mirror assemblies to replace those already provided.

Further, the actuating mechanism for previously automatically controlled mirror assemblies, in addition to completely integrated mirror units, have also employed gearing arrangements which have made them quite expensive and subject to malfunction.

Our previously mentioned copending application discloses apparatus solving these problems by providing mechanism which can be readily connected between existing members in the steering mechanism and mirror assemblies commonly used in truck-trailer combinations to provide a movement of the mirrors in response to steering wheel movement in a manner to provide increased visibility while turning. Relatively inexpensive mechanism is employed for producing the movement of the mirrors.

While such apparatus has been generally satisfactory, there are several inherent problems which if overcome would render the assembly even more useful. First, by producing rotation of each mirror in the same direction during a turn and rotating them together in the opposite direction during a turn in the opposite direction, it has been found that the mirror opposite to the turning direction is of no use during a major portion of the turn. Also in the previously disclosed assembly slight movement of the steering wheel produces a corresponding movement of the mirrors, and while this is desirable during actual turning situations, it is not desirable when only steering motions are being made in what is otherwise essentially straight driving. In backing up for instance, the steering wheel may be rotated several degrees without complete turns ever being made. In such situations the mirror assembly would be more useful if the mirrors did not rotate at all.

SUMMARY OF THE PRESENT INVENTION

The present invention provides an actuating mechanism which like that of our previously disclosed invention, can be readily connected between existing members in the steering mechanism and mirror assemblies commonly used in truck-trailer combinations to provide a movement of the mirrors in response to steering wheel movement in a manner which provides maximum visibility. Moreover, unlike our previously disclosed assembly, the apparatus of the present invention is operable to rotate the mirrors in the same direction each time but in directions opposite to each other regardless of the direction of the turn. Thus both mirrors are rotated away from the truck regardless of the direction of the turn. This has been found to provide a greater range of visibility by maintaining a view by way of the mirror on the side opposite the turning side through a major portion of the turn.

Further, the appartus of the present invention includes means providing lost motion in the area of turning within a few degrees of straight ahead position of the steering wheel so that movement of the steering wheel in this area will not affect the position of the mirrors. This maintains the mirrors in a relatively fixed position when the truck is being driven on what is essentially a straight line even though the steering might require some slight movements of the steering wheel.

The apparatus of the present invention includes a first axially movable member which is clamped at one end to a member of the steering mechanism which pivots in response to turning movement of the steering wheel. The opposite end of this member is connected to the leg of a pivotally mounted T-shaped member. The arms of the T-shaped member are connected to a hydraulic system which rotates the mirrors in a direction away from the truck regardless of the turning direction.

DESCRIPTION OF THE DRAWINGS

A more complete understanding of the present invention will be apparent from the following description of several preferred embodiments. The description makes reference to the accompanying drawings in which like reference characters refer to like parts throughout the several views and in which:

FIG. 2 is a view partly in section illustrating the apparatus of FIG. 1;

FIG. 3 is a fragmentary cross-sectional view substantially as seen from line 3—3 of FIG. 2 and enlarged somewhat for purposes of clarity;

DESCRIPTION OF A PREFERRED EMBODIMENT

Figure 1:
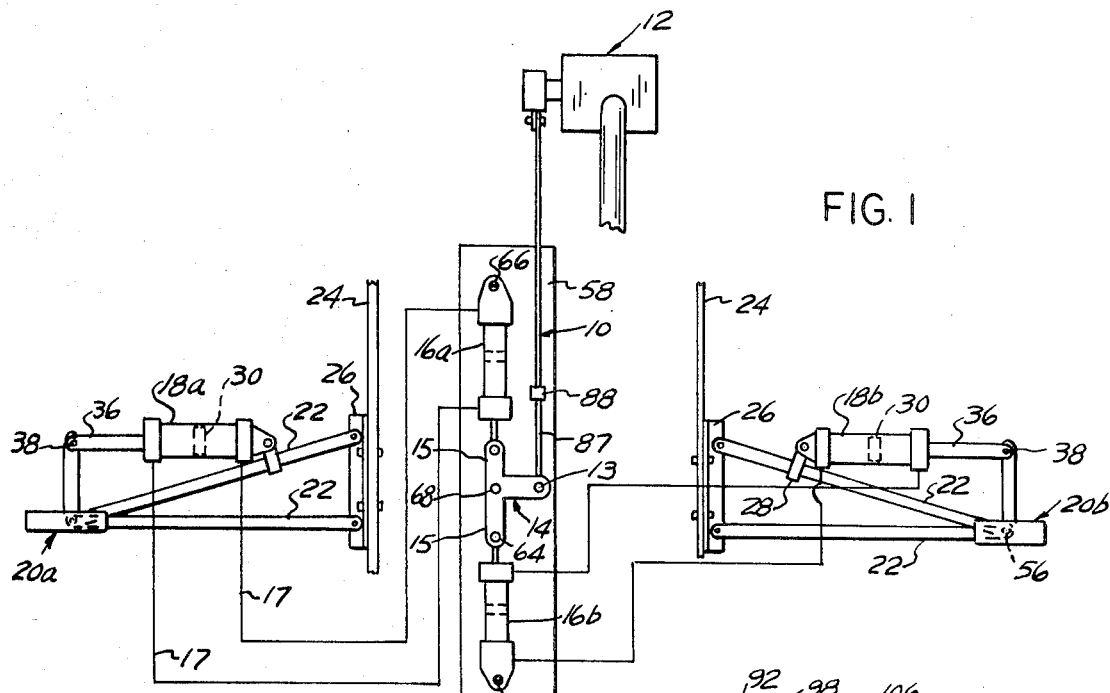
FIG. 1 is a schematic view illustrating a preferred embodiment of the present invention.
Figure 4:
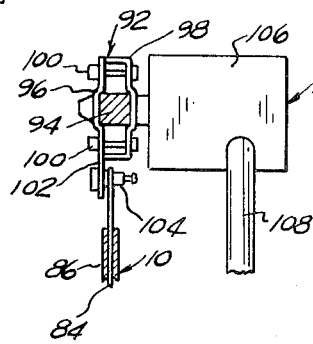
FIG. 4 is a fragmentary view substantially as seen from line 4—4 of FIG. 2.
Figure 5:
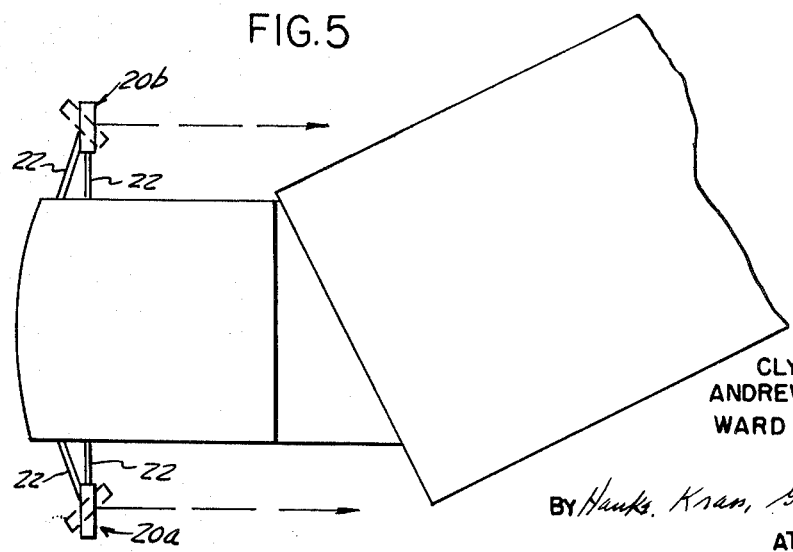
FIG. 5 is a schematic view illustrating the manner of operation of mirror assemblies utilizing the actuating means of the present invention.

Now referring to the drawings for a more detailed description of the present invention, a preferred embodiment thereof is illustrated in FIGS. 1–4 as comprising a cable assembly generally indicated by reference numeral 10 connected at one end to the steering mechanism 12 of a truck or the like and at the opposite end to the leg 13 of a T-shaped member 14. The arms 15 of the T-shaped member 14 are pivotally connected to cylinders 16a and 16b. Fluid lines 17 connect the cylinders 16a and 16b with auxiliary cylinders 18a and 18b respectively and which are in turn connected to pivotally mounted mirrors 20a and 20b respectively.

As can best be seen in FIG. 2, the mirrors 20a and 20b are of conventional construction and preferably are of the type which are pivotally mounted top and bottom to supporting struts 22 which in turn are secured to the side 24 (FIG. 1) of the vehicle by brackets 26.

As can best be seen in FIGS. 1–2, the auxiliary cylinders 18a and 18b are each mounted by a clamp 28 to one of the struts 22 supporting the mirror 20a and 20b to which the particular cylinder 18a or 18b is attached. The cylinders 18a and 18b are alike in construction and are each provided with a piston 30 movable in response to pressure introduced on opposite sides thereof through ports 32 and 34. Movement of the piston 30 produces movement of a rod 36 which is pivotally connected at 38 to a clamp assembly 40.

The clamp assembly 40, as can best be seen in FIG. 2, comprises a first substantially L-shaped member 42 having a twisted section 44 at one end to which the rod 36 is pivotally attached and a flange section 46 at the opposite end adapted to engage the edge of the mirror. A second substantially L-shaped member 48 is provided with a flange section 50 at one end which engages the edge of the mirror opposite the flange section 46 so that when the members 42 and 48 are brought together, the mirror is securely clamped between flange sections 46 and 50. A nut and bolt 52 provide the tightening means and the member 48 is provided with a bent portion 54 at the end opposite the flange section 50 which aids in directing the force produced by the nut and bolt 52 to produce the clamping action. Movement of the piston 30 then causes the mirrors 20a and 20b to pivot about in the vertical axis 56.

As illustrated in FIGS. 1–3 the cylinders 16a and 16b are preferably mounted to a plate 58 and each preferably includes a piston 60 movable within the cylinder by a rod 62 pivotally connected at 64 to the arms 15 of the T-shaped member 14. The ends of the cylinders opposite the rod 62 are pivotally mounted to the plate 58 by pins 66 as is the T-shaped member 14 by pin 68 so that rocking motion of the T-shaped member 14 in either direction extends the rods 62 outwardly from the cylinders and moves the pistons 60 toward each other.

The cylinders 16a and 16b are provided with ports 70 and 72 (FIG. 2) connecting the fluid lines 17 with the interior of the cylinder on opposite sides of the piston 60. The lines 17 connect ports 70 and 72 with ports 32 and 34 respectively of the auxiliary cylinders 18a and 18b so that extension of the rods 62 increases pressure ahead of the pistons 30 and thereby increases the fluid pressure at ports 34 to produce retraction of the rods 36 and thereby move the mirrors 20a and 20b in opposite directions away from the side of the vehicle.

The cable assembly 10 preferably comprises an inner cable or wire 84 (FIGS. 2 and 4) axially movable within a guide tubing 86. One end of the cable 84 is joined to the end of a rod 87 by a connector 88. The rod 87 is connected to the leg 13 of the T-shaped member 14 by a pivotally mounted connector 89 so that movement of the cable or wire produces corresponding movement of the rod 87 which in turn pivots the T-shaped member 14 about the pivot 68. The guide tubing 86 is fixed at several points to the plate 58 such as by clamps 90 so that the tubing 86 remains stationary as the cable or wire 84 is moved.

The opposite end of the cable 84 is connected to a clamp assembly 92 which is in turn clamped to a steering arm member 94. The steering arm member 94 is a part of the conventional steering mechanism of a vehicle and is commonly called the pitman arm. As can best be seen in FIG. 4, the clamp assembly 92 comprises a first member 96 and a second member 98 adapted to fit on opposite sides of the arm member 94 and to be secured together by nuts and bolts 100. The member 96 is moved with an extending portion 102 which carries a swivel connector 104 for attachment to the end of the cable or wire 84.

The steering arm member 94 connects the steering gear mechanism 106 to the linkage means (not shown) of the vehicle for turning the front wheels of the truck in response to rotation of a steering shaft 108 by a steering wheel (not shown). Thus rotation of the shaft 108 produces pivoting of the arm member 94 about the pivot point 110. This acts through the swivel connection 104 to produce movement of the inner cable or wire 84 to move the rod 87 accordingly and to thereby produce a positioning of the mirrors 20a and 20b which corresponds with the degree of rotation of the shaft 108. The direction of rotation of the shaft 108 of course depends upon the direction the vehicle is being turned and the arm 94 will pivot to a degree and in a direction depending upon the degree and the rotation of the shaft 108. Regardless of the direction of turning, however, as explained above, the mirrors 20a and 20b will rotate in the same direction. That is, the left hand mirror 20a will rotate clockwise away from the vehicle whether the turn is to the right or left and the right hand mirror 20b will rotate counterclockwise regardless of the direction of the turn. The degree of rotation of the mirrors 20a and 20b however will depend upon the degree of turning and by a proper adjustment of the position of the clamping assembly 92 along the length of the arm or by adjusting the position of the cylinders 18a and 18b to produce the desired correspondence between rotation of the steering wheel and rotation of the mirrors a maximum visibility throughout any turn can be achieved.

An important advantage of the present invention over those heretofore disclosed, aside from the construction which rotates the mirrors outwardly and in the same direction regardless of the direction of the turn, resides in another result achieved by the T-shaped member 14. The particular connection between the leg 15 of this member and the steering mechanism to translate pivoting movement of the member 94 to linear movement of the pistons 60 results in a certain amount of lost motion for about 15° of movement of the T-shaped member 14 in either direction about the pivotal connection 68. Thus during slight turning movement of the steering wheel the mirrors 20a and 20b remain stationary. This is an especially important advantage when backing up a truck and trailer combination where slight turning motions are necessary and where because the effect on the trailer is slight and can be seen in a fixed mirror, it is more convenient to have the mirrors remain fixed.

Although the assembly of the present invention includes a hydraulic system for translating pivotal movement of the T-shaped members to pivotal movement of the mirrors, it is apparent that other means could be used instead for this purpose. For instance, such a connection could of desired be made through linkage mechanism or by way of cables or the like. Likewise, the cable assembly connecting the steering mechanism to the T-shaped member could be replaced by various other means for producing the desired result. A hydraulic system could be used for instance or the connection could be a direct linkage system without the cable assembly.

It is apparent also that we have described an automatic actuating means for positioning truck mirrors and the like which is readily adaptable to existing vehicle and mirror constructions. Many trucks are using mirrors like those illustrated herein and all vehicles have the steering arm member to which the present mechanism is designed to be attached. This attachment does not require expensive modifications of the vehicle and in many cases the existing mirrors can be used. There are a number of places within the mechanism where adjustment can be made so that any desired positioning of the mirrors can be achieved.

The present invention represents an important improvement over the prior art including our own previous application. This improvement resides in the movement of the mirrors in directions opposite to each other but in the same direction regardless of the direction of the turn. This has been found to provide the best visibility through the mirror on the side opposite the turn. The other improvement results from the lost motion produced by the T-shaped member as described above and the effect of steering wheel motion on motion of the mirrors when only slight turning is occurring as produced by this lost motion construction.

It is apparent also that although we have described but a single embodiment of our invention many changes and modifications can be made without departing from the spirit of the invention or the scope of the appended claims.

We claim:

1. Means for connecting a pair of pivotally mounted rear view mirrors to a vehicle to produce pivotal movement of the mirrors as the vehicle turns, said vehicle having steering mechanism which includes an elongated first member pivotally movable in response to turning of the vehicle, said means comprising:
   first means connected with said first member and movable axially in one direction in response to rotation of said first member in one direction and movable axially in an opposite direction in response to rotation of said first member in an opposite direction, a second member having a leg portion, a pair of outwardly extending arms and a pivot point intermediate said leg portion and said pair of arms, said leg portion being connected with said first means so that the axial movement of said first means produces pivoting of said arms about said pivot point,
   means connecting one of said pair of arms to one of said mirrors and the other of said arms to the other of said mirrors to produce rotation of said mirrors upon pivoting of said mirrors about said pivot point, said last mentioned means including a first hydraulic cylinder connected to one of said mirrors and actuated by pivotal movement of said arms about said pivot point in either a clockwise direction or a counterclockwise direction to produce pivotal movement of the mirror in a clockwise direction and a second hydraulic cylinder connected to the other of said mirrors and actuated by pivotal movement of said arms in either a clockwise direction or a counterclockwise direction to produce pivotal movement of the other mirror in a counterclockwise direction.

2. The combination as defined in claim 1 and including a clamp member engaging said mirror and an axially movable member pivotally connected with said clamp member whereby axial movement of said member causes said mirror to pivot.

3. The invention as defined in claim 1, and including link members connecting said arms to pivotal connections with said hydraulic cylinders and in which the said pivotal connections are spaced from said pivot point and the connection between said first means and said leg such that initially pivotal movement of said second member about said pivot point produces relatively small movement of said arms whereby slight movement of the steering mechanism does not affect the mirrors.

4. The combination as delned in claim 1, and including a clamp member engaging each of said mirrors and an axially movable member pivotally connected with said clamp member whereby axial movement of said last mentioned member causes said mirrors to pivot.

5. The combination as defined in claim 1, and including means connecting said first means and said first member comprising a clamp member mounted to said first member in a manner permitting radial adjustment.

6. A mirror actuating system for a vehicle having a pair of pivotally mounted mirrors, one on each side of said vehicle and steering mechanism moving in response to and in correspondence with turning of the vehicle, said actuating system comprising:
   a pivotally mounted member having a leg and a pair of outwardly extending arms,
   means connecting said steering mechanism and said leg of said member to produce pivoting of said member in a direction and to a degree which depends upon the direction and degree of turning of said vehicle,
   a hydraulic cylinder connected to each of said arms, each of said cylinders having a piston and a rod connected to said piston at one end and to said arms at the opposite end whereby pivoting of said member produces movement of said rods to increase the fluid pressure ahead of said pistons, and
   a second set of hydraulic cylinders one each connected with said mirrors to actuate said mirrors and fluid lines connecting said first mentioned cylinders respectively with said second set of cylinders.

7. The system as defined in claim 6 and including a clamp member engaging each of said mirrors and an axially movable member pivotally connected with said clamp member whereby axial movement of said last mentioned member causes said mirrors to pivot.

8. The system as defined in claim 6 and in which the connections between said pivotally mounted member, said steering mechanism does not affect the position of piston rods are pivotal and are spaced to produce lost motion between initial movement of said leg and movement of said piston rods whereby initial movement of said steering mechanism does not affect the position of said mirrors.

9. The system as defined in claim 8, and in which movement of said steering mechanism to produce pivoting of said pivotal member produces no effect on said mirrors during initial pivotal movement of about 15°.

10. A mirror actuating system for a vehicle having a pair of pivotally mounted mirrors one on each side of said vehicle and steering mechanism moving in response to and in correspondence with turning of the vehicle, said actuating system comprising:
   a member connected with said steering mechanism and movable with said steering mechanism in two opposite directions in response to turning in opposite directions of said vehicle, a first means connected with said member and producing substantially linear motion in one direction regardless of the direction of movement of said member, said first means being connected to the mirror on one side of the vehicle and operable to produce rotation of said mirror in a clockwise direction regardless of the direction of turn of said vehicle and a second means connected with said member and producing substantially linear motion in one direction regardless of the direction of movement of said member, said second means being connected to the mirror on the other side of said vehicle and operable to produce rotation of said mirror in a counterclockwise direction regardless of the direction of turn of said vehicle.

11. The mirror actuating system as defined in claim 10 and including means connecting said member and said first and second means and operable to cause movement of said mirrors only after an initial predetermined movement of said steering mechanism whereby slight movements of the steering wheel of the vehicle do not affect the position of the mirrors.

References Cited
UNITED STATES PATENTS

| | | | |
|---|---|---|---|
| 2,758,508 | 8/1956 | Petri et al. | 350—289 |
| 2,854,892 | 10/1958 | Stark | 350—307 |
| 3,166,630 | 1/1965 | Esslinger | 350—299 |
| 3,208,343 | 9/1965 | Prochnow | 350—302 |
| 2,330,444 | 4/1941 | Park. | |
| 2,626,539 | 1/1953 | Peterson. | |
| 2,873,647 | 2/1959 | Bach. | |
| 2,988,957 | 6/1961 | Kotora. | |
| 3,005,384 | 10/1961 | Baird et al. | |

DAVID SCHONBERG, Primary Examiner

M. J. TOKAR, Assistant Examiner

U.S. Cl. X.R.

74—501